(12) United States Patent
Li et al.

(10) Patent No.: US 10,169,989 B2
(45) Date of Patent: *Jan. 1, 2019

(54) TRANSPORTATION VEHICLE TRAFFIC MANAGEMENT

(71) Applicant: International Business Machines Corporation, Armonk, NY (US)

(72) Inventors: Weijun Li, Xian (CN); Chong Liu, Xian (CN); Xiao Ting Xiao, Beijing (CN); Jinfan Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,884

(22) Filed: Jul. 14, 2017

(65) Prior Publication Data

US 2018/0053409 A1 Feb. 22, 2018

Related U.S. Application Data

(63) Continuation of application No. 15/242,570, filed on Aug. 21, 2016, now Pat. No. 9,747,793.

(51) Int. Cl.
*G08G 1/07* (2006.01)
*G08G 1/01* (2006.01)
(Continued)

(52) U.S. Cl.
CPC .............. *G08G 1/07* (2013.01); *G08G 1/017* (2013.01); *G08G 1/0112* (2013.01);
(Continued)

(58) Field of Classification Search
CPC ........ G08G 1/07; G08G 1/0125; G08G 1/095; G01L 19/08
(Continued)

(56) References Cited

U.S. PATENT DOCUMENTS

| 7,979,173 B2 | 7/2011 | Breed |
| 8,352,111 B2 | 1/2013 | Mudalige |

(Continued)

FOREIGN PATENT DOCUMENTS

| WO | 2010103504 A1 | 9/2010 |
| WO | 2016065055 A1 | 4/2016 |

OTHER PUBLICATIONS

Azimi, Reza; "Co-Operative Driving at Intersections Using Vehicular Networks and Vehicle-Resident Sensing"; <http://repository.cmu.edu/cgi/viewcontent.cgi?article=1622&context=dissertations>; Jul. 2015.

(Continued)

*Primary Examiner* — Hirdepal Singh
(74) *Attorney, Agent, or Firm* — L. Jeffrey Kelly

(57) ABSTRACT

Disclosed aspects relate to transportation vehicle traffic management. A traffic controller detects a first traffic state parameter value for a first lane. In response to detecting the first traffic state parameter value, the traffic controller establishes a first broadcast of a first movement value (e.g., speed, acceleration, direction). The first movement value may indicate a first movement pattern for a first set of vehicles in the first lane. In response to establishing the first broadcast of the first movement value, the traffic controller detects a second traffic state parameter value for the first lane. In response to detecting the second traffic state parameter value the traffic controller modifies the first broadcast of the first movement value. The modified first movement value may indicate a second movement pattern for the first set of vehicles in the first lane.

16 Claims, 8 Drawing Sheets

(51) Int. Cl.
| | |
|---|---|
| *G08G 1/017* | (2006.01) |
| *G08G 1/0967* | (2006.01) |
| *G08G 1/00* | (2006.01) |
| *H04W 4/04* | (2009.01) |
| *H04L 29/08* | (2006.01) |
| *G08G 1/095* | (2006.01) |
| *G08G 1/087* | (2006.01) |
| *G01S 13/93* | (2006.01) |

(52) U.S. Cl.
CPC ......... *G08G 1/0116* (2013.01); *G08G 1/0125* (2013.01); *G08G 1/0145* (2013.01); *G08G 1/095* (2013.01); *G08G 1/096725* (2013.01); *G08G 1/096741* (2013.01); *G08G 1/096783* (2013.01); *G08G 1/22* (2013.01); *H04L 67/00* (2013.01); *H04W 4/046* (2013.01); *G01S 2013/936* (2013.01); *G01S 2013/9325* (2013.01); *G08G 1/087* (2013.01)

(58) Field of Classification Search
USPC ........................................................ 340/907
See application file for complete search history.

(56) References Cited

U.S. PATENT DOCUMENTS

| | | | |
|---|---|---|---|
| 8,781,707 B2 | 7/2014 | Kagawa et al. | |
| 8,842,022 B2 | 9/2014 | Wignot et al. | |
| 8,977,420 B2* | 3/2015 | Deng | B60W 30/165 340/932 |
| 9,147,348 B2 | 9/2015 | Emam et al. | |
| 9,154,982 B2 | 10/2015 | Chan et al. | |
| 9,196,158 B2 | 11/2015 | Publicover | |
| 9,672,734 B1 | 6/2017 | Ratnasingam | |
| 9,715,827 B2* | 7/2017 | Ng | G08G 1/091 |
| 9,792,821 B1 | 10/2017 | Yalla et al. | |
| 9,834,219 B2* | 12/2017 | Matsuno | B60W 30/18172 |
| 9,857,800 B2 | 1/2018 | Ben Shalom et al. | |
| 2005/0174257 A1 | 8/2005 | Shankwitz et al. | |
| 2010/0026520 A1 | 2/2010 | Witte et al. | |
| 2013/0013130 A1 | 1/2013 | Emam et al. | |
| 2013/0153771 A1 | 6/2013 | Kiesel et al. | |
| 2013/0211624 A1 | 8/2013 | Lind et al. | |
| 2013/0304279 A1 | 11/2013 | Mudalige et al. | |
| 2014/0107867 A1 | 4/2014 | Yamashiro | |
| 2014/0132422 A1 | 5/2014 | Borland et al. | |
| 2014/0159925 A1* | 6/2014 | Mimeault | G01S 17/58 340/935 |
| 2014/0316671 A1 | 10/2014 | Okamoto | |
| 2015/0269845 A1 | 9/2015 | Calmettes et al. | |
| 2016/0004915 A1* | 1/2016 | Chen | G06K 9/00791 348/149 |
| 2016/0231746 A1 | 8/2016 | Hazelton et al. | |
| 2016/0307444 A1* | 10/2016 | Koshizen | G08G 1/0133 |
| 2017/0008521 A1 | 1/2017 | Braunstein et al. | |
| 2017/0084172 A1* | 3/2017 | Rolle | G08G 1/095 |
| 2017/0186314 A1 | 6/2017 | Bernhardt et al. | |
| 2017/0221366 A1* | 8/2017 | An | G08G 1/0965 |
| 2017/0278386 A1* | 9/2017 | Ko | G08G 1/0112 |
| 2017/0278388 A1* | 9/2017 | Bansal | G08G 1/0145 |

OTHER PUBLICATIONS

Hemakumar et al.; "Optimized Traffic Signal Control System at Traffic Intersections Using Vanet"; <http://www.iosrjournals.org/iosr-jce/papers/Vol15-issue3/G01533643.pdf?id=7557>; 2013.

Le et al.; "Vehicular Wireless Short-Range Communication for Improving Intersection Safety"; <http://ieeexploreieee.org/xpl/articleDetails.jsp?tp=&arnumber=5307473&url=http%3A%2F%2Fieeexplore.ieee.org%2Fxpls%2Fabs_all .jsp%3Farnumber%3D5307473>.

Bharade et al.; "Robust and Adaptive Traffic Surveillance System for Urban Intersections on Embedded Platform"; <http://ieeexplore.ieee.org/xpl/articleDetails.jsp?arnumber=7030429&queryText=Vehicle%20lane%20control%20monitor%20intersection&newsearch=true>.

Zou et al.; "Traffic Light Control for a Single Intersection Based on Wireless Sensor Network"; <http://ieeexplore.ieee.org/xpl/articleDetails.jsp?arnumber=5273994&queryText=Vehicle%20lane%20control%20monitor%20intersection&newsearch=true>.

Sartre-Consortium; "The Sartre Project"; <http://www.sartre-project.eu>.

Wikimedia Foundation, Inc.; "Dedicated short-range communications"; <https://en.wikipedia.org/wiki/Dedicated_short-range_communications>.

Pending U.S. Appl. No. 15/242,570, filed Aug. 21, 2016, entitled: "Transportation Vehicle Traffic Management", 44 pages.

IBM: List of IBM Patents or Patent Applications Treated as Related (Appendix P), Aug. 09, 2017, 2 pages.

Pending U.S. Appl. No. 15/649,892, filed Jul. 14, 2017, entitled: "Transportation Vehicle Traffic Management", 36 pages.

IBM: List of IBM Patents or Patent Applications Treated as Related (Appendix P), Jun. 8, 2018, 2 pages.

Pending U.S. Appl. No. 16/000,981, filed Jun. 6, 2018, entitled: "Transportation Vehicle Traffic Management", 46 pages.

* cited by examiner

500

550

US 10,169,989 B2

TRANSPORTATION VEHICLE TRAFFIC MANAGEMENT

BACKGROUND

This disclosure relates generally to computer systems and, more particularly, relates to transportation vehicle traffic management.

SUMMARY

In a computer implemented method for vehicle traffic management, a traffic controller detects a first traffic state parameter value for a first lane. In response to detecting the first traffic state parameter value, the traffic controller establishes a first broadcast of a first movement value. The first movement value indicates a first movement pattern for a first set of vehicles in the first lane. In response to establishing the first broadcast of the first movement value, the traffic controller detects a second traffic state parameter value for the first lane. In response to detecting the second traffic state parameter value the traffic controller modifies the first broadcast of the first movement value. The modified first movement value indicates a second movement pattern for the first set of vehicles in the first lane.

In other illustrative embodiments, a computer program product comprising a computer readable storage medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus includes at least one processor and a memory coupled to the at least one processor. The memory has instructions which, when executed by the at least one processor, cause the at least one processor to perform various ones of, and combinations of, the operations outlined above with regard to the method illustrative embodiment.

These and other features of the present invention will be described in, or will become apparent to those of ordinary skill in the art in view of, the following detailed description of example embodiments of the present invention.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
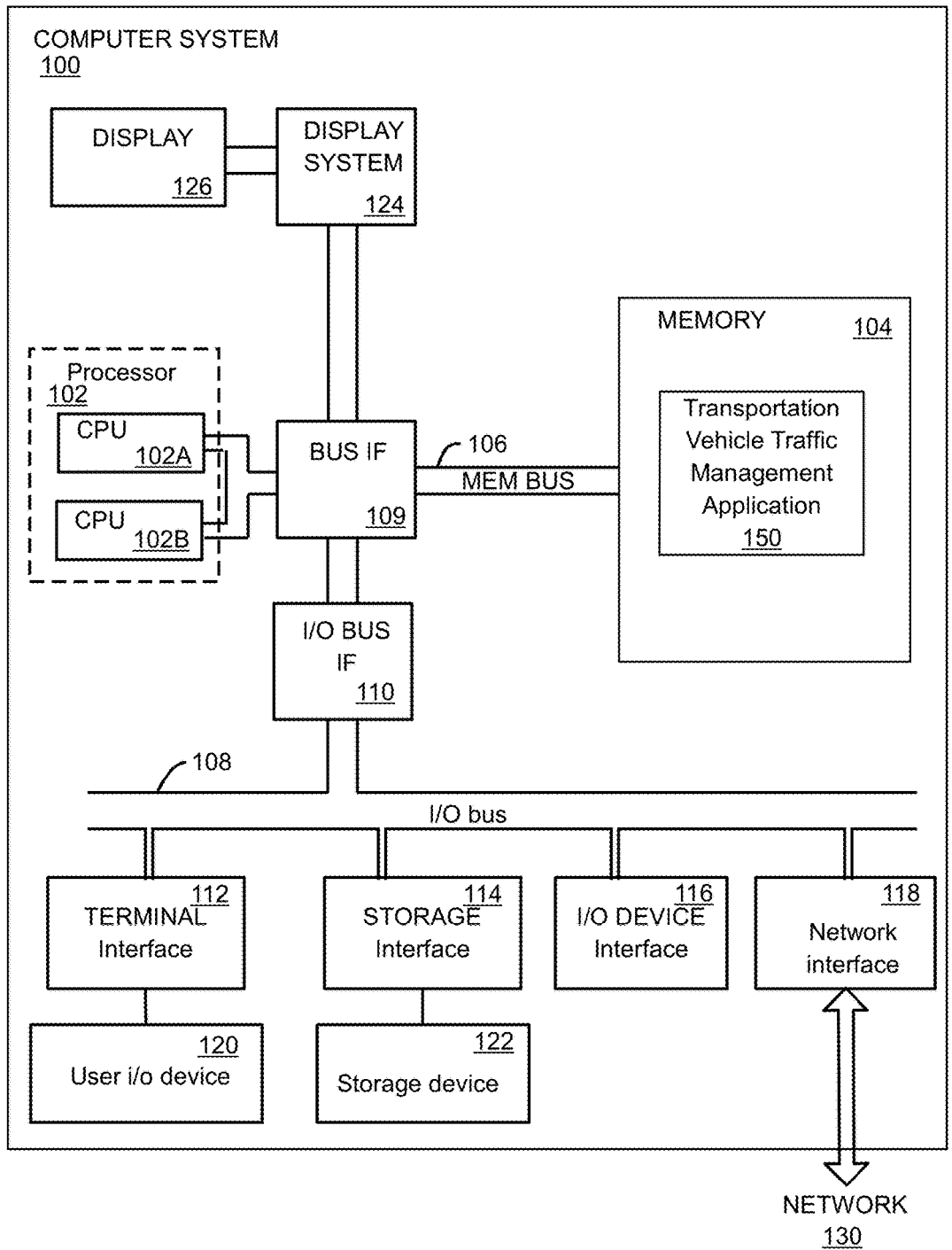
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For transportation vehicle traffic management, the amount of data that needs to be managed is increasing. As data needing to be managed increases, the need for management efficiency may increase.

Aspects of the disclosure relate to managing and controlling a set of transportation vehicles in a set of movement patterns such as synchronously starting. A traffic light can have a logical state that is output as digital signal, such as a green light that is turned on and off. A traffic controller may link with the traffic light. By the link, the traffic controller may obtain a real-time status of lights in the traffic light, such as whether a red light or a green light is on. The traffic controller can communicate with the set of transportation vehicles such as to send or receive electronic messages from specified vehicles. As such, the traffic controller may identify a first transportation vehicle in a first lane as a first stopped vehicle at an intersection while also recognizing the first lane. Also, the traffic controller may broadcast a frequency synchronizing signal such as a Sync Start Signal (SSS) to a specified lane such as the first lane in order to direct a set of transportation vehicles to synchronously move or start acceleration as a platoon. The traffic controller may receive warning exception messages sent from a transportation vehicle in a lane, and the traffic controller can respond in a dynamic fashion.

A vehicle module for a transportation vehicle may be connected with a central computer system of the transportation vehicle. For example, the vehicle module may collect a set of distance/space information such as that related to the vehicle and its surroundings such as other vehicles. The vehicle module can bi-directionally communicate with the traffic controller to determine a lane position for its transportation vehicle. One or more vehicle modules can configure bi-directional communication to identify which lane the associated transportation vehicles are in. The traffic controller can configure sets of the transportation vehicles as platoons based on their lanes. The vehicle module can control a vehicle speed change in a very small time slice (e.g., at a nanosecond level). The time slice can be defined in the SSS. Such control may include acceleration, braking, etc. As such, the vehicle module can accelerate the transportation vehicle from zero in accordance with the SSS information. The vehicle module may receive status information with respect to the transportation vehicle itself. Accordingly, when starting the transportation vehicle, it can handle real-time exceptions triggered by the vehicle hardware or the driver.

At an intersection on a roadway, after the traffic light turns green, each driver tends to start moving sequentially one-by-one after the front vehicle moves. Such movement can be time-consuming and less efficient than it needs to be. Reaction times to control vehicle movement or start-up can vary and can lead to a negative experience for users. In aggregate, a significant amount of green light time may be wasted on a consistent basis which can, at least at times, cause traffic jams at the intersection that are worse than they need to be in instances of heavy traffic flow. Aspects of the disclosure may centrally control the movement/starting process to let the transportation vehicles in the same lane essentially synchronously move forward (similar to a hard-linked train) so as to have positive impacts on performance and efficiency (e.g., temporal benefits, energy/fuel benefits).

Consider the example that follows. In one lane, all vehicles could synchronously move forward at a speed of 5 kilometers per hour. T is the green-light time. L is the average safe length of one vehicle, which includes one vehicle length and an additional distance between another vehicle. An entire platoon may be synchronously moved at once such that: INT((5000 meters/3600 seconds)*T/L). As such, In case T=60 seconds, L=7 meters, then the number to pass intersection may be: INT((5000 meters/3600 seconds) *60 seconds/7 meters)=9 vehicles.

Aspects of the disclosure may utilize a traffic controller to assist an autonomous vehicle to navigate an intersection in an efficient manner while operating safely and securely. Autonomous vehicles are automobiles that have the ability to operate and navigate without human input. Autonomous vehicles use sensors, such as radar, LIDAR, global positioning systems, and computer vision, to detect the vehicle's surroundings. Advanced computer control systems interpret the sensory input information to identify appropriate navigation paths, as well as obstacles and relevant signage. Autonomous vehicles may communicate with remote computer systems via wireless network connections and with one another using dedicated short range communications (DSRC).

Aspects of the disclosure can broadcast a predefined safe speed to control a set of vehicles as a virtual platoon to speed-up travel in a synchronized manner. Transportation vehicles may be synchronously moved/started from a speed of zero at intersections. Lead vehicles may or may not be utilized such that the front vehicle of a platoon may have varying responsibility. Once the vehicles have passed the intersection by a threshold distance, a broadcast of a movement value may expire or deemed inapplicable such that the movement value or start speed need not be maintained as such. Various lanes can be differentiated to connect related vehicles and control connected vehicles using a common movement value or speed. As such, distinct platoons may be configured for different lanes. As such, each lane may have its own start-speed and security distance based on various factors at the intersection (e.g., historical accident information, weather conditions).

Aspects of the disclosure include a method, system, and computer program product for transportation vehicle traffic management. A traffic controller detects a first traffic state parameter value for a first lane. In response to detecting the first traffic state parameter value, the traffic controller establishes a first broadcast of a first movement value (e.g., speed, acceleration, direction). The first movement value may indicate a first movement pattern for a first platoon of vehicles in the first lane. In response to establishing the first broadcast of the first movement value, the traffic controller detects a second traffic state parameter value for the first lane. In response to detecting the second traffic state parameter value the traffic controller modifies the first broadcast of the first movement value. The modified first movement value may indicate a second movement pattern for the first platoon of vehicles in the first lane.

In embodiments, another set of operations may occur for a second lane. The traffic controller may detect a third traffic state parameter value for a second lane. In response to detecting the third traffic state parameter value, the traffic controller can establish a second broadcast of a second movement value to indicate a third movement pattern for a second platoon of vehicles in the second lane. In response to establishing the second broadcast of the second movement value, the traffic controller may detect a fourth traffic state parameter value for the second lane. In response to detecting the fourth traffic state parameter value, the traffic controller may modify the second broadcast of the second movement value to indicate a fourth movement pattern for the second platoon of vehicles in the second lane.

In various embodiments in response to detecting the fourth traffic state parameter for the second lane, the traffic controller may establish the first broadcast of the first movement value to indicate the first movement pattern for the first platoon of vehicles in the first lane. Altogether, transportation vehicle traffic management may be associated with performance or efficiency benefits (e.g., data security, application stability, speed, flexibility, load balancing, responsiveness, resource usage, productivity). Aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a transportation vehicle traffic management application 150. In embodiments, the transportation vehicle traffic management application 150 may include instructions or statements that execute on the processor 102 or instructions or statements that are interpreted by instructions or statements that execute on the processor 102 to carry out the functions as further described below. In certain embodiments, the transportation vehicle traffic management application 150 is implemented in hardware via semiconductor devices, chips, logical gates, circuits, circuit cards, and/or other physical hardware devices in lieu of, or in addition to, a processor-based system. In embodiments, the transportation vehicle traffic management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
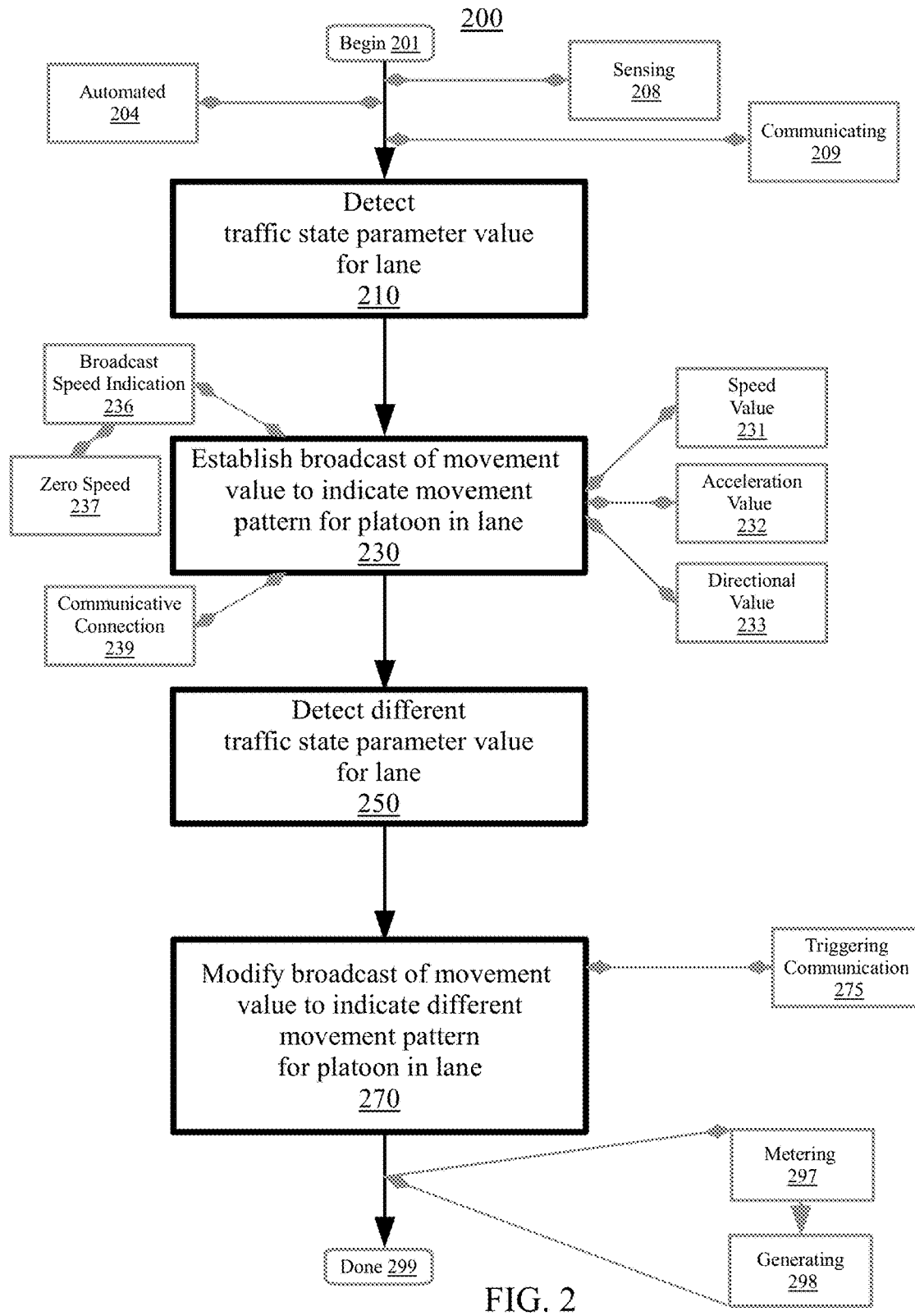
FIG. 2 is a flowchart illustrating a method for transportation vehicle traffic management according to embodiments.

FIG. 2 is a flowchart illustrating a method 200 for transportation vehicle (e.g., one or more trucks, tractor-trailers, buses, cars, motorcycles, tractors, all terrain vehicles, golf carts, bicycles, automobiles, or the like) traffic management according to embodiments. Transportation vehicle traffic management may be used in an autonomous or assisted driving environment (e.g., self-driving vehicle for passengers or cargo). The method 200 may begin at block 201. In embodiments at block 204, the operational steps such as the detecting, the establishing, the detecting, and the modifying each occur in an automated fashion without user intervention or manual action (e.g., using automated computing machinery, fully machine-driven without manual stimuli). The automated operational steps may be performed by a traffic controller (e.g., as part of a traffic control system).

In various embodiments, the traffic controller can sense a first platoon of vehicles in a first lane at block 208. The traffic controller can sense (e.g., using a sensor such as a visual sensor, motion sensor, still image camera, video camera, or the like) a second platoon of vehicles in a second lane, a third platoon of vehicles in a third lane, etc. Sensing can include discovering, identifying, detecting, recognizing, or the like. A platoon of vehicles can include one or more trucks, tractor-trailers, cars, motorcycles, tractors, all terrain vehicles, golf carts, bicycles, automobiles, or the like. The platoon of vehicles may be aligned such as to continue on a given route (e.g., straight ahead, turn right, turn left, curve while maintaining their lane). A lane can include a space or area configured for travel by a transportation vehicle such as within lines (e.g., solid lines, dashed/dotted lines) that define the space or area as a route or path, though lines may or may not be used.

In certain embodiments, a communication of a lane position may be made at block 209. The communication may be between the traffic controller and a vehicle module. Communicating can include transmitting, providing, publishing, routing, sending, presenting, outputting, or the like. The lane position can indicate a specific lane (e.g., first lane) or an order/sequence in a platoon (e.g., third vehicle of the platoon). The vehicle module may be in or for the vehicle whose position is being described (e.g., a module located in a car in the second lane having the fourth position from the front/stop-line/intersection). The vehicle module can connect to a central computing system of the vehicle. The traffic controller and the vehicle module may communicate via various communication linkages (e.g., radio waves or the like) and may have a third-party intermediary, in some embodiments, such that information is intercepted by a cloud-based traffic intersection management software engine which oversees a given intersection.

At block 210, a first traffic state parameter value for a first lane (e.g., a traffic/driving/movement lane for one or more transportation vehicles) is detected. Traffic state parameter values may be detected by the traffic controller. Detecting can include receiving (e.g., from an application, from a computer), sensing (e.g., in a multidimensional array, in an application), observing (e.g., based on a physical sensor), or a like identification operation. Traffic state parameter values may correspond to, apply to, or be directed to one or more lanes (e.g., a first lane only, first and second lanes). A traffic state parameter value can indicate traffic to go, yield, be cautious, stop, turn, not turn, or the like. For example, traffic state parameter values may map to a green light (e.g., go), a yellow light (e.g., be cautious traveling through the intersection), a red light (e.g., stop), a flashing green turn arrow, a flashing yellow turn arrow, a flashing yellow, a flashing red, or the like. For instance, a "1" for a first traffic state parameter value may indicate to go and map to a green light. Various other values or signals may be utilized.

At block 230, a first broadcast of a first movement value may be established to indicate a first movement pattern for a first platoon of vehicles in the first lane. The first broadcast may be established/initiated by the traffic controller. Establishing can include initiating performance/execution, generating, compiling, constructing, assembling, outputting, forming, organizing, providing, presenting, configuring, introducing, or the like. The first broadcast may be established/initiated in response to detecting the first traffic state parameter value. A broadcast can include a transmission, publication, communication, output, presentation, conveyance, or a like routing/sending operation in a wireless manner or otherwise. A platoon of vehicles in a lane can include a threshold number of automobiles which may be pieced-together via a curve (e.g., a straight line of ten cars).

One or more movement values can indicate one or more movement patterns. A movement value may include a speed value (e.g., 0 miles per hour, 5 kilometers per hour, 10 miles per hour) at block 231. A movement value can include an acceleration value (e.g., 10 feet per second per second) at block 232. A movement value may include a directional value (e.g., due North, 135 degrees, straight line, curved) at block 233. A movement pattern may be a combination of movement values (e.g., go straight ahead at a predefined speed such as 15 miles per hour). The movement pattern can instruct how the platoon of vehicles in the lane is to travel or change location.

In embodiments, the first broadcast can indicate to change a set of speed values of the first platoon of vehicles in the first lane at block 236. For example, the first broadcast may communicate (e.g., to the first platoon of vehicles) a speed value of five miles per hour for two seconds and then a speed value of ten miles per hour for the next two seconds. Accordingly, the set of speed value may indicate acceleration or deceleration. In various embodiments, the set of speed values includes a speed of zero at block 237. For instance, the first broadcast may target or maintain a stopped position for the first platoon of vehicles. While cross-traffic is moving, the first broadcast may include the speed of zero. In embodiments, the first broadcast includes a communicative connection of the traffic controller with the first platoon of vehicles in the first lane at block 239. As such, the communicative connection (e.g., one-way, two-way) can include more than one vehicle (such as more than just a lead vehicle) and could be connected with each vehicle in the lane within a threshold distance (e.g., cars within the first 50 feet). Various possibilities for broadcasts are considered.

At block 250, a second traffic state parameter value for the first lane is detected. The second traffic state parameter value may be detected by the traffic controller in response to establishing the first broadcast of the first movement value (e.g., subsequent to or during the first broadcast of the first movement value). For example, the detection may result from a traffic signal changing from stop/red (e.g., a first traffic state parameter value) to go/green (e.g., the second traffic state parameter value), or the like. Aspects may be similar or the same as the traffic controller detecting the first traffic state parameter value for the first lane. Various combinations of changes between the first and second (or third, fourth, etc.) traffic state parameter values are possible.

At block 270, the first broadcast of the first movement value is modified to indicate a second movement pattern for the first platoon of vehicles in the first lane. The modification may be made by the traffic controller in response to detecting the second traffic state parameter value. Modifying can include changing, altering, shifting, updating, or the like. The modification may be made in a dynamic fashion (e.g., in real-time, on-the-fly). For example, the traffic controller may be initially broadcasting a movement value of twenty-five miles per hour to indicate a movement pattern of moving vehicles in a manner straight through the intersection and then dynamically adjust the movement value to zero miles per hour to indicate a movement pattern of stopped vehicles. The broadcast may remain constant (or at least relatively constant) with the movement value of the broadcast changing so that the movement pattern adjusts entirely. As such, a single traffic controller can manage an entire intersection having multiple lanes in a plurality of directions by having a plurality of broadcasts of movement values which can be modified to indicate/establish various movement patterns for multiple platoons of vehicles in multiple lanes. In certain embodiments, different platoons of vehicles in a single lane may have different movement values (e.g., the first thirty cars are to proceed through the intersection and the vehicles thereafter are to replace the thirty vehicles in front of them in line).

In embodiments, a triggering communication may be received at block 275. The triggering communication can be received by the traffic controller from a transportation vehicle. Receiving can include detecting, sensing, or accepting as an input. The triggering communication can include a warning exception message related to a small distance between vehicles, a person walking between a gap in vehicles, a mechanical warning in a vehicle, a steering wheel being turned beyond a threshold, a braking operation which exceeds a threshold, a human interruption, or the like. The traffic controller may receive the triggering communication from any vehicle in any lane. For example, it may be a vehicle of the first platoon in the first lane, or an emergency vehicle in any of a plurality of lanes configured in a same direction. In response to receiving the triggering communication, the first broadcast of the first movement value may be modified. The modification can be made in a dynamic fashion by the traffic controller. Accordingly, the traffic controller can modify movement patterns in real-time using various movement values. As such, positive impacts on safety, performance, and efficiency may be realized using aspects described herein.

In embodiments, a third traffic state parameter value for a second lane may be detected by the traffic controller. In response to detecting the third traffic state parameter value, the traffic controller may establish a second broadcast of a second movement value to indicate a third movement pattern for a second platoon of vehicles in the second lane. In response to establishing the second broadcast of the second movement value, a fourth traffic state parameter value for the second lane can be detected by the traffic controller. In response to detecting the fourth traffic state parameter value, the traffic controller may modify the second broadcast of the second movement value to indicate a fourth movement pattern for the second platoon of vehicles in the second lane. Accordingly, a single traffic controller may manager a plurality of lanes. For instance, the third traffic state parameter value may be "3" which correlates to a left-turn green arrow (perhaps while other lanes are red and being broadcast a "2" value). As such, the third movement pattern for the second platoon of vehicles in the second lane may indicate for the transportation vehicles to go at an arc to turn left at given speed such as ten miles per hour. The fourth traffic state parameter value (e.g., "4") may correlate to a red left-turn arrow which may occur while other lanes are green. As such, the fourth movement pattern for the second platoon of vehicles in the second lane may indicate for the transportation vehicles to no longer go at an arc to turn left at ten miles per hour but instead to stop entirely (or stop if it has not yet entered the intersection). Various possibilities are considered including for lanes in parallel to one another (in the same or opposite directions), perpendicular to one another, and various other combinations including roundabouts and the like.

In embodiments, the first broadcast of the first movement value to indicate the first movement pattern for the first platoon of vehicles in the first lane may be established by the traffic controller in response to detecting the fourth traffic state parameter for the second lane. In embodiments, a third broadcast of a fifth movement value to indicate a fifth movement pattern for a third platoon of vehicles in a third lane may be established by the traffic controller in response to detecting the fourth traffic state parameter for the second lane. For example, a stop of transportation vehicles in the second lane may be detected thereby ceasing left-turns. Accordingly, a "go" may be broadcast for the first/third lane (e.g., for traffic coming head-on with respect to the second lane). Various other possibilities and combinations are considered, and the examples are illustrative.

In certain embodiments, a usage assessment may be generated with respect to the transportation vehicle traffic management or the traffic controller. Use of the transportation vehicle traffic management may be metered at block 297. For example, service-life extensions may be measured, safety-factors may be considered, overall economic impact may be accounted for, functional up-time relative to a benchmark (e.g., historical functional up-time) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 298. The generated invoice may be provided (e.g., displayed in a dialog box, sent or transferred by e-mail, text message, initiated for traditional mail) to the user for notification, acknowledgment, or payment.

Method 200 concludes at block 299. Aspects of method 200 may provide performance or efficiency benefits with respect to transportation vehicle traffic management. For example, aspects of method 200 may include positive impacts on traffic flow, resource usage, speed, or productivity with respect to transportation vehicle traffic management. In embodiments, performance or efficiency benefits when using a traffic controller to manage transportation vehicle traffic may occur (e.g., speed, flexibility, load balancing, responsiveness, productivity).

Figure 3:
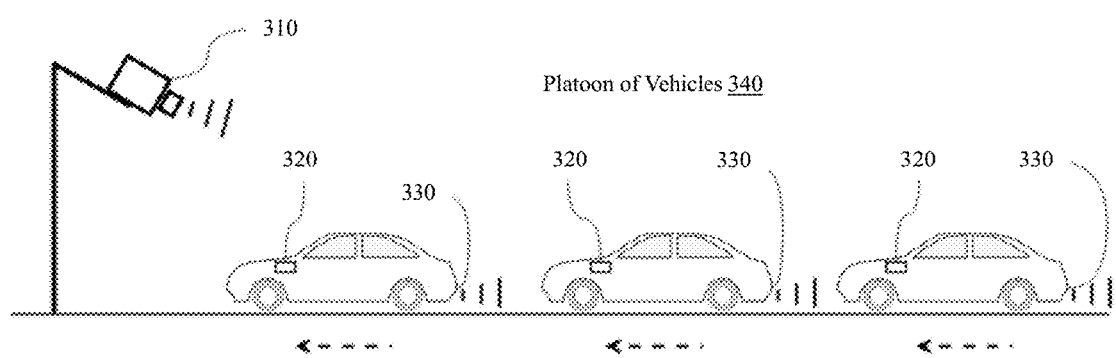
FIG. 3 illustrates a system for transportation vehicle traffic management according to embodiments.

FIG. 3 illustrates a system 300 for transportation vehicle traffic management according to embodiments. The system 300 can include a traffic controller 310 which may be referred to as a Lane Control Monitor (LCM). The lane control module may be linked with a traffic light or the like. The traffic light may have a logical state output in a digital signal such as whether a green light is turned-on. The system 300 may have a platoon of vehicles 340. One or more of the vehicles may be equipped with a set of vehicle modules. A first vehicle module 320 may be referred to as a Sync Start Manager (SSM). A second vehicle module 330 may be referred to as a distance monitor (e.g., radar). The second vehicle module 330 can collect a set of spatial relationships. For example, the second vehicle module 330 may be used to gather various distances between various transportation vehicles. Such information may be transmitted to or retrieved by the traffic controller 310.

In embodiments, the second vehicle module 330 may be used to configure distances between vehicles in the platoon of vehicles 340. For example, the set of vehicle modules may be used to construct, generate, or build a fixed platoon of vehicles. For instance, the platoon of vehicles 340 may be fixed-together such that each vehicle will move together at a same speed for a temporal period. The same speed may be that speed value received from a broadcast by the traffic controller 310. Also, the platoon of vehicles 340 may be fixed-together such that they are kept apart at one or more distances configured using the second vehicle module 330. In various embodiments, the distances between vehicles of the platoon are the same. In certain embodiments, distances between various vehicles of the platoon are specifically configured using the second vehicle modules. For example, larger vehicles such as tractor-trailers may trail a small vehicle such as a bicycle by a longer distance than a bicycle would trail a tractor-trailer. In various embodiments, a vehicle module on a vehicle may determine a speed of the vehicle for a temporal period (e.g., due to an emergency vehicles presence in the area, for safety reasons, to override a broadcast speed value when being tailgated by a trailing vehicle for longer than a threshold temporal period).

Figure 4:
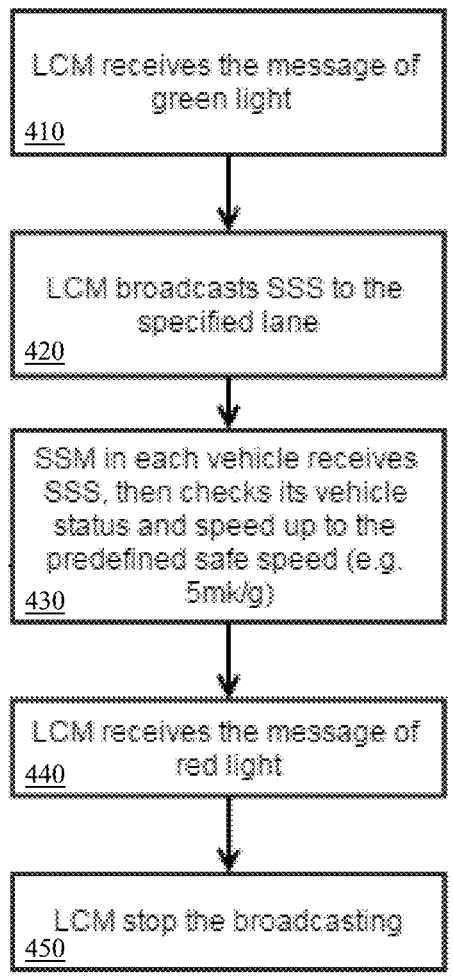
FIG. 4 is a flowchart illustrating a method for transportation vehicle traffic management according to embodiments.

FIG. 4 is a flowchart illustrating a method 400 for transportation vehicle traffic management according to embodiments. The method 400 illustrates how a transportation vehicle can speed-up (from a stop) in one period. At block 410, the traffic controller detects a first traffic state parameter value (e.g., LCM receives the message of green light). At block 420, the traffic controller broadcasts a first movement value to indicate a first movement pattern for a first platoon of vehicles in the first lane (e.g., LCM broadcasts a Sync Start Signal (SSS) to the specified lane). The SSS may include a command message to inform vehicles to synchronously move. At block 430, the transportation vehicle may use its vehicle module to operate the vehicle in accordance with the broadcast, movement value, and movement pattern (e.g., SSM in each vehicle receives SSS, checks its status, and speeds-up to a predefined/received speed). At block 440, the traffic controller detects a second traffic state parameter value (e.g., LCM receives the message of red light). At block 450, the traffic controller modifies the broadcast (e.g., LCM stops broadcast of the SSS). The broadcast may be terminated in response to the traffic controller receiving an exception message (e.g., a human interruption, an emergency, a triggering event occurs).

Figure 5:
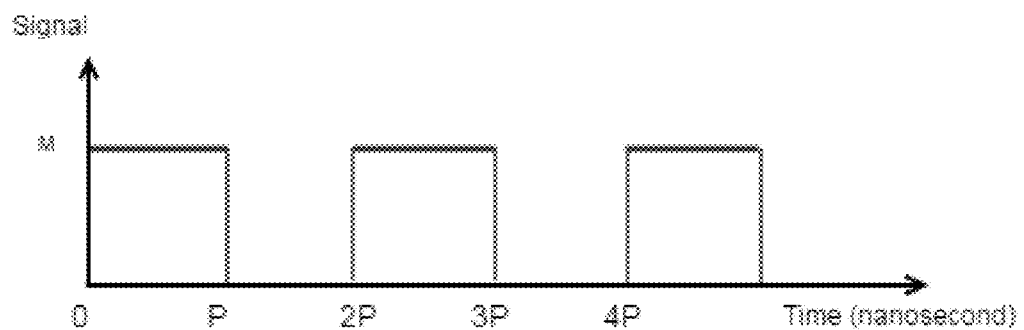
FIG. 5 illustrates a system for transportation vehicle traffic management according to embodiments.
Figure 5:
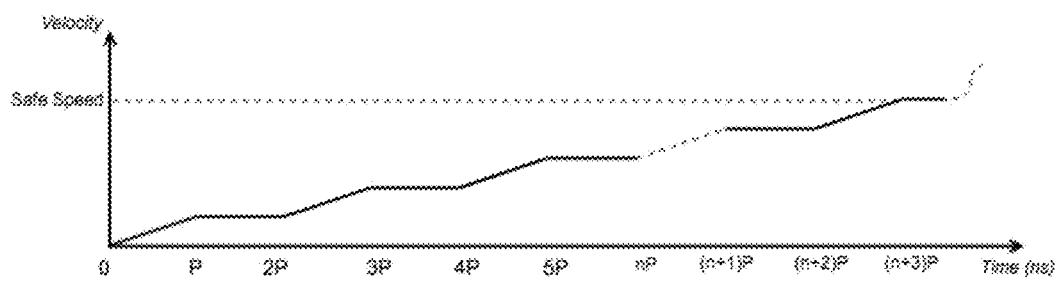

FIG. 5 illustrates a system for transportation vehicle traffic management according to embodiments. The system may relate to continuous or periodical signals which can control transportation vehicle acceleration and the like. The system can include a broadcast formula represented by diagram 500 and speed formula represented by diagram 550. Diagram 500 illustrates a set of data (M) (e.g., a movement value) which can be broadcast in real-time for a predefined constant period (P) of the SSS. Accordingly, as represented by diagram 500, SSS=M when $nP \leq t < (n+1)P$, SSS=null when $(n+1)P \leq t < (n+2)P$, and n=0, 2, 4, . . . . Diagram 550 illustrates a vehicle speed (V), an acceleration (A) which is transmitted with SSS, t is a current time relative to the beginning time point of the initial SSS, and S is a safe speed transmitted with SSS. Accordingly, if V<S then $V=A*(t-nP/2)$ when $nP \leq t < (n+1)P$ and n=0, 1, 2, 3, . . . ; otherwise, V=a vehicle driver-controlled speed.

Figure 6:
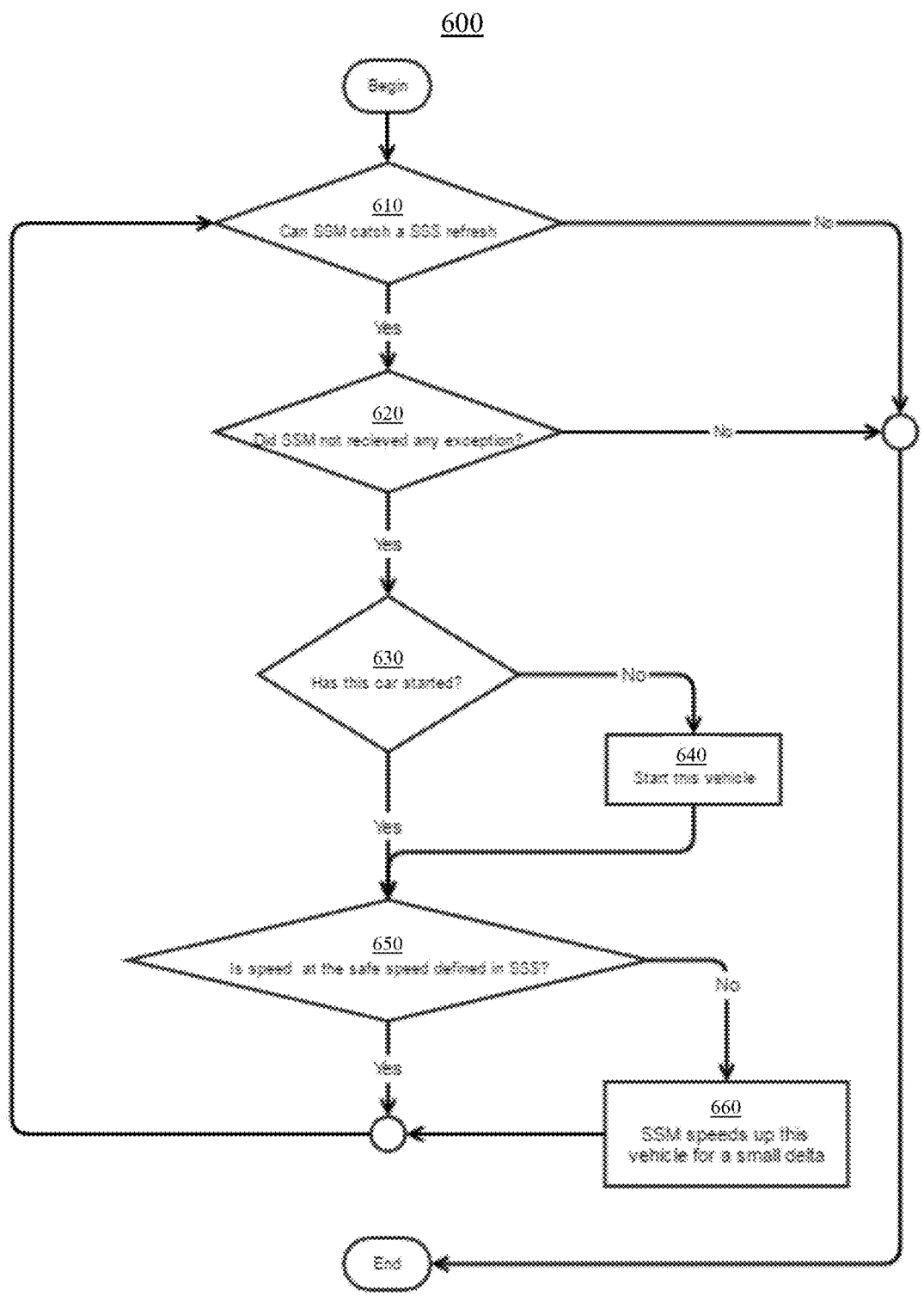
FIG. 6 is a flowchart illustrating a method for transportation vehicle traffic management according to embodiments.

FIG. 6 is a flowchart illustrating a method 600 for transportation vehicle traffic management according to embodiments. The method 600 may illustrate operations within an acceleration period when the SSM catches SSS=M. The operations may execute in time periods 0~P, 2P~3P, 4P~5P, etc. as shown in FIG. 5. Accordingly, the time usage of the operations is less than or equal to P. It is determined whether SSM can receive a SSS refresh at block 610. At block 620, it is determined whether an exception was/was not received by the SSM. If the SSM does not receive a movement value for more than two periods, then the driver of the transportation vehicle may be provided with full control of the transportation vehicle (or at least speed control). At block 630, it is determined whether the transportation vehicle is moving (e.g., started, not stopped). If the transportation vehicle was not moving (e.g., engine not running) at block 630, the transportation vehicle is started for movement (e.g., start engine) at block 640. At block 650, it is determined whether the transportation vehicle is moving at a safe speed defined in the SSS. If the transportation vehicle is not moving at the safe speed, the SSM changes the speed of the transportation vehicle (e.g., speeds-up a small amount of speed, speeds-up for a small time period, slows-down, slows-down by not accelerating) at block 660.

Figure 7:
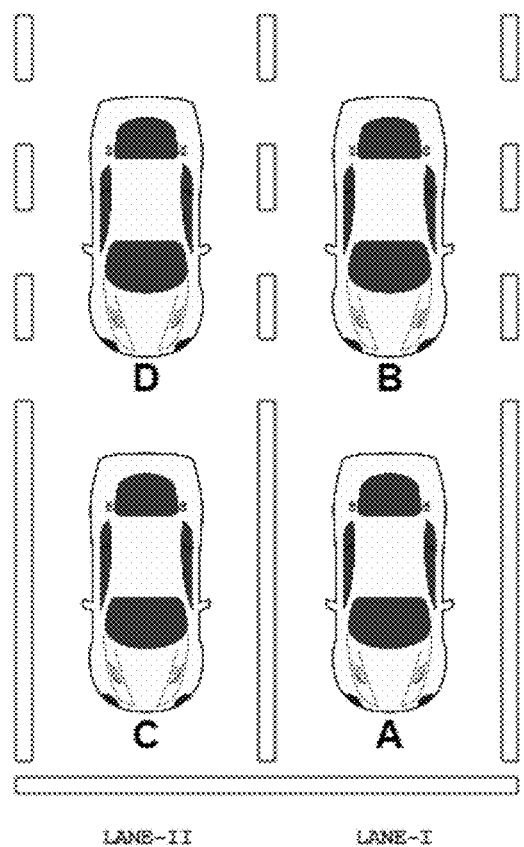
FIG. 7 illustrates a system for transportation vehicle traffic management according to embodiments.
Figure 7:
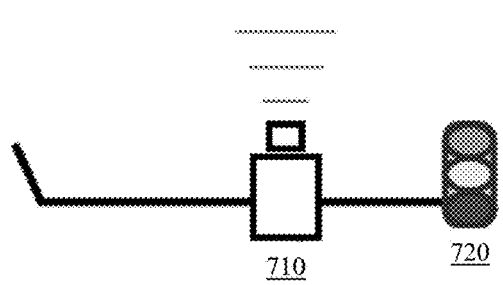

FIG. 7 illustrates a system 700 for transportation vehicle traffic management according to embodiments. The system 700 depicts a single traffic controller 710 managing a plurality of lanes and a plurality of platoons of transportation vehicles. The traffic controller 710 may utilize dedicated short range communications (DSRC) which is a two-way short-to-medium-range wireless communications capability that permits very high data transmission in communications-based active safety applications. The traffic controller 710 may indicate, flag, or mark the lanes as a first lane (Lane-I) and a second lane (Lane-II). A logical linkage to a traffic light 720 may exist with respect to the traffic controller 710. Altogether, aspects may facilitate constructing a plurality of platoons of transportation vehicles in a plurality of lanes. Other possibilities (e.g., using multiple traffic controllers) are contemplated.

Figure 8:
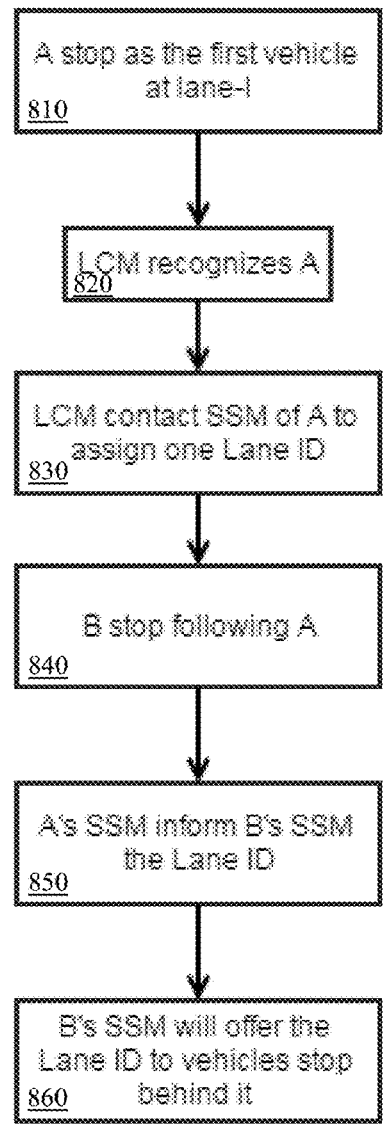
FIG. 8 is a flowchart illustrating a method for transportation vehicle traffic management according to embodiments.

FIG. 8 is a flowchart illustrating a method 800 for transportation vehicle traffic management according to embodiments. The method 800 may relate to constructing a platoon of transportation vehicles. At block 810, a first transportation vehicle (vehicle A) may stop as a first vehicle in a first lane (such as Lane-I in FIG. 7). At block 820, the traffic controller (LCM) may identify, detect, or recognize the first transportation vehicle. The LCM may communicate with the SSM of vehicle A to assign a first lane identifier for the first lane at block 830. A second transportation vehicle (vehicle B) may stop behind the first transportation vehicle at block 840. A first vehicle module in the first transportation vehicle may communicate with a second vehicle module in the second transportation vehicle to provide the first lane identifier for the first lane at block 850. At block 860, the second vehicle module in the second transportation vehicle can provide the first lane identifier for the first lane to one or more transportation vehicles which stop behind the second transportation vehicle in the first lane.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer program product for transportation vehicle traffic management, the computer program product comprising a non-transitory computer readable storage medium having program instructions embodied therewith the program instructions executable by a processor to cause the processor to perform a method comprising:

detecting, by a traffic controller, a first traffic state parameter value for a first lane;

establishing, by the traffic controller in response to detecting the first traffic state parameter value, a first broadcast of a first movement value to indicate a first movement pattern for a first set of vehicles in the first lane;

detecting, by the traffic controller in response to establishing the first broadcast of the first movement value, a second traffic state parameter value for the first lane;

modifying, by the traffic controller in response to detecting the second traffic state parameter value, the first broadcast of the first movement value to indicate a second movement pattern for the first set of vehicles in the first lane;

detecting, by the traffic controller, a third traffic state parameter value for a second lane;

establishing, by the traffic controller in response to detecting the third traffic state parameter value, a second broadcast of a second movement value to indicate a third movement pattern for a second set of vehicles in the second lane;

detecting, by the traffic controller in response to establishing the second broadcast of the second movement value, a fourth traffic state parameter value for the second lane; and modifying, by the traffic controller in response to detecting the fourth traffic state parameter value, the second broadcast of the second movement value to indicate a fourth movement pattern for the second set of vehicles in the second lane.

2. The computer program product of claim 1, further comprising:

establishing, by the traffic controller in response to detecting the fourth traffic state parameter for the second lane, the first broadcast of the first movement value to indicate the first movement pattern for the first set of vehicles in the first lane.

3. The computer program product of claim 1, wherein the first movement value includes a speed value.

4. The computer program product of claim 1, wherein the first movement value includes an acceleration value.

5. The computer program product of claim 1, wherein the first movement value includes a directional value.

6. The computer program product of claim 1, wherein the first broadcast indicates to change a set of speed values of the first set of vehicles in the first lane.

7. The computer program product of claim 6, wherein the set of speed values includes a speed of zero.

8. The computer program product of claim 1, wherein the first broadcast includes a communicative connection of the traffic controller with the first set of vehicles in the first lane.

9. The computer program product of claim 1, further comprising:
sensing, by the traffic controller, the first set of vehicles in the first lane.

10. The computer program product of claim 1, further comprising:
receiving, by the traffic controller from a transportation vehicle, a triggering communication; and
modifying, in a dynamic fashion by the traffic controller in response to receiving the triggering communication, the first broadcast of the first movement value.

11. The computer program product of claim 1, further comprising:
collecting, by a vehicle module, a set of spatial relationships.

12. The computer program product of claim 1, further comprising:
communicating, between the traffic controller and a vehicle module, a lane position.

13. The computer program product of claim 1, further comprising:
constructing, by a vehicle module, a fixed set of vehicles.

14. The computer program product of claim 1, further comprising:
determining, by a vehicle module on a vehicle, a speed of the vehicle for a temporal period.

15. The computer program product of claim 1, wherein the transportation vehicle traffic management occurs in an automated fashion without user intervention.

16. The computer program product of claim 1, further comprising:
metering use of the transportation vehicle traffic management; and
generating an invoice based on the metered use.

* * * * *